United States Patent Office 2,877,214
Patented Mar. 10, 1959

2,877,214

POLYMERIZATION OF THIOVINYL ETHERS AND PRODUCTS

Milton H. Opheim and Boris Franzus, Bartlesville, Okla., assignors to Phillips Petroleum Company, a corporation of Delaware No Drawing. Application June 12, 1956
Serial No. 590,833

14 Claims. (Cl. 260—79.7)

This invention relates to a process for the suspension copolymerization of thiovinyl ethers with unsaturated organic compounds polymerizable therewith, and to copolymers of thiovinyl ethers. In one aspect the invention relates to suspension copolymerization of certain thiovinyl ethers with unsaturated organic compounds polymerizable therewith in the presence of a suspending medium for the dispersed monomer phase and in the presence of a first polymerization catalyst soluble in the suspending medium and a second polymerization catalyst soluble in the monomer phase.

It is an object of the invention to provide a method for the suspension copolymerization of certain thiovinyl ethers with unsaturated organic compounds polymerizable therewith. It is a further object of the invention to provide solid copolymers of certain thiovinyl ethers with unsaturated organic compounds.

There are four conventional recognized categories of polymerization, namely, bulk, solution, suspension, and emulsion polymerizations. The present invention is concerned with suspension polymerization. Suspension polymerization procedures are well known in the art and are described in the technical literature. Reference is made, for instance, to Bovey et al., "High Polymers," volume IX, published by Interscience Publishers, New York (1955), see especially page 11 et seq. In suspension polymerization the monomers are suspended as small droplets in a medium, usually water, in which the monomers have very low solubility or substantially no solubility. Suspending or dispersing agents are employed to keep the droplets and polymer particles from coalescing. The degree of agitation controls to some degree the size of the solid particles of polymer produced. When monomers are polymerized in the suspension type polymerization system, the solid polymers are frequently obtained in the shape of beads or pearls. Suspension polymerization is ordinarily considered to be a bulk polymerization in isolated droplets, and is to be sharply distinguished from so-called emulsion polymerization, wherein the monomers are also dispersed as a discontinuous phase in a continuous phase, but wherein soap or other emulsifiers are employed in such concentrations that micelles are formed. These micelles greatly influence, as is well known in the art, the character and course of the polymerization, especially in the early stages.

Our process is concerned, as stated, with the type of polymerization known as suspension polymerization, not with the type of polymerization known as emulsion polymerization, although it is not now definitely known that the mechanism of the polymerization is the same as the theory of mechanism advanced for prior art suspension polymerization processes.

In prior art suspension polymerization processes a catalyst or initiator which is soluble in the dispersed organic phase is employed rather than a catalyst soluble in the aqueous phase. In attempting to copolymerize the thiovinyl ethers using a catalyst soluble in the monomer phase, we have found that such a procedure does not yield the desired solid polymers, but rather gives liquid polymers. Also, when attempting to use a catalyst soluble in the continuous phase (usually aqueous), liquid polymers, rather than the desired solid copolymers, were obtained.

According to our invention we have provided a process which comprises the suspension copolymerization of a thiovinyl ether with another monomer having at least one $CH_2=C<$ radical in the presence of a polymerization catalyst soluble in the continuous phase in which the monomer droplets are suspended and also in the presence of another catalyst which is soluble in the monomer droplets.

Thus, the process comprises suspending the monomers containing a proper catalyst dissolved therein, in a non-solvent medium which may contain a small amount of dissolved or dispersed suspending agent or dispersant. In addition there is dissolved in the non-solvent medium a second catalyst which, together with the monomer soluble catalyst, will cause the globules or droplets of polymerizable material in the suspension to polymerize to a solid in the form of discrete particles.

Suitable thiovinyl ethers are those possessing the formula:

$$CH_2=CH-S-R$$

wherein R is a hydrocarbon radical containing from 1 to 18 carbon atoms, for example, an alkyl, aryl, cycloalkyl, aralkyl, alkaryl or alkylcycloalkyl radical. Exampes of these thiovinyl ethers include methyl vinyl sulfide, ethyl vinyl sulfide, tert-butyl vinyl sulfide, 3-methylpentyl vinyl sulfide, tert-dodecyl vinyl sulfide, octadecyl vinyl sulfide, cyclohexyl vinyl sulfide, phenyl vinyl sulfide, xylyl vinyl sulfide, tolyl vinyl sulfide, benzyl vinyl sulfide, 1-naphthyl vinyl sulfide, methylcyclohexyl vinyl sulfide, and alpha-methylcyclohexyl vinyl sulfide. These compounds can be prepared by any method known in the art, such as vinylation of a mercaptan. In the preparation of the copolymers of this invention the amount of the thiovinyl ether employed will generally be in the range of 0.5–30 parts, preferably 1 to 10 parts by weight per 100 parts of total monomers, although amounts outside these ranges can be employed.

Examples of copolymerizable monomers which are applicable are those containing at least one $CH_2=C<$ radical and are capable of copolymerization with the thiovinyl ether. Typical examples include, among others, conjugated olefins such as 1,3-butadiene, isoprene, chloroprene, 2,3-dimethyl-1,3-butadiene, methylpentadiene, piperylene, and the like; aryl olefins, such as styrene, alpha-methylstyrene, p-methoxystyrene, 2-vinylpyridine, 2-methyl-5-vinylpyridine, 3-ethyl-5-vinylpyridine, and 2-vinyl-5-ethylpyridine.

As previously discussed, a suspending or dispersing agent is generally employed in suspension polymerization, as is well known in the art, to prevent the droplets of monomers or polymer particles from coalescing when brought in contact by agitation. We usually employ such an agent. The dispersing agents employed can be chosen from any of those known in the art, such as methyl cellulose, sodium alginates, gum tragacanth, karaya gum, gelatin, alkyl aryl sodium sulfonates, fatty acid soaps, and rosin acid soaps. Finely divided inorganic dispersants are also useful, such as magnesium phosphate. When employing a soap or other emulsifier capable of forming micelles, only very small or trace amounts are employed, i. e., concentrations below concentrations where micelles would be formed. Concentrations such that micelles would be formed are avoided. Otherwise, the polymerization would proceed partially or wholly by emulsion polymerization mechanism.

As the monomer soluble catalyst, any catalyst capable of promoting the polymerization of thiovinyl ethers, in bulk or solution, can be employed. We now prefer to employ a peroxide, preferably an organic peroxide. Examples of suitable organic peroxides are benzoyl peroxide, di(tertiary butyl) peroxide, methyltetrahydrofurane peroxides, aldehyde and ketone peroxides, acetyl peroxide, stearyl peroxide, toluyl peroxide, anisyl peroxide, tertiary butyl hydroperoxide, cumene hydroperoxide, methylcyclohexyl hydroperoxide, and cyclohexyl hydroperoxide.

As the continuous phase soluble catalyst, when the continuous phase is an aqueous phase, we now prefer to employ a water-soluble peroxide. Examples of such catalysts or initiators include hydrogen peroxide, sodium peroxide, barium peroxide, peracetic acid, perbenzoic acid, perpropionic acid, 1-hydroxy-cyclohexyl hydroperoxide, and hydroxy heptyl peroxide.

The amount of the catalyst which is soluble in the continuous or suspending phase which is employed is generally in the range from 0.1 to 30 parts, preferably from 0.5 to 10 parts, per 100 parts of monomers. The amount of monomer-soluble catalyst which is employed is generally in the range of 0.3 to 15 parts, preferably 1–5 parts, per 100 parts of monomers.

The temperature for effecting the polymerization reaction is generally in the range from 10–180° C., preferably in the range from 40–90° C.

The polymerization is generally effected at atmospheric pressure but obviously higher or lower pressures can be used. However, reaction conditions must be such that the reaction mixture is maintained substantially completely in the liquid phase.

The products of the present invention are true copolymers in the form of solid particles, frequently being in the form of a powder, or pearls or beads. The products after washing and drying are free flowing. They are thermoplastic and are especially useful directly for the production of finished articles, toys, ash trays, discs, rods, and various shaped objects, by injection molding, compression molding, or extrusion, and by other techniques of plastic molding.

As is well known in the art, recovery of the polymers is easily effected if the reaction has been carried to 100 percent conversion of the monomers. The polymer suspension is merely allowed to settle from the suspending medium, and the continuous phase decanted, or the polymers are filtered from the suspending medium and are thereafter dried. If the polymerization is not carried to 100 percent conversion of the monomers, it is usually desirable to wash the polymers before drying with a solvent medium for the monomers, which will not substantially dissolve any of the polymers, or, in cases where feasible, unreacted monomers can be distilled or evaporated from the suspension before proceeding with the filtration or decanting steps. In some instances the polymer can be purified by dissolving the impure product in a suitable solvent and then precipitating the polymer from the solution by any desirable method. These are all conventional procedures which are well known in the art.

Preferably, the monomer soluble catalyst is substantially insoluble in the suspending medium and the water soluble catalyst is substantially insoluble in the monomers.

In the following examples the polymerization reactions were conducted in a 5-liter, 3-neck glass flask equipped with a stirrer, cold water condenser and nitrogen bleed. The nitrogen was slowly bled into the system in order to maintain a blanket of inert gas over the reaction mixture. The flask was heated with an electric mantel. In these runs the hydrogen peroxide was charged as a 30 weight percent aqueous solution.

*Example I*

A polymerization was conducted according to the following recipe:

| Ingredient: | Parts by weight |
|---|---|
| Styrene | 97.5 |
| tert-Dodecyl vinyl sulfide | 2.5 |
| Alkyl aryl sodium sulfonate | 0.0025 |
| Gelatin | 0.5 |
| Water | 500 |
| Benzoyl peroxide | 1.0 |
| Hydrogen peroxide (100% $H_2O_2$ basis) | 0.75 |

The suspension stabilizers, gelatin and the alkyl aryl sodium sulfonate, were dissolved in the water which had been added to the flask. After dissolving 1.0 part of benzoyl peroxide in 100 parts of monomers, the resulting solution was added to the reactor. The resulting suspension was heated to 70° C. while adding 0.75 part of hydrogen peroxide (on 100 percent $H_2O_2$ basis) to the reaction mixture. The suspension was stirred slowly and the reaction temperature maintained at 70° C. during the polymerization time of about 15 hours. At the end of this time, the suspension was filtered to remove the polymer, and the polymer was dried under vacuum over night to remove unreacted monomers and water. A white, solid copolymer composed of discrete pear particles was recovered. The yield was 37.5 weight percent (150 grams) based on total monomers charged.

*Example II*

A polymerization was effected using the following recipe:

| Ingredient: | Parts by weight |
|---|---|
| Styrene | 97.5 |
| tert-Dodecyl vinyl sulfide | 2.5 |
| Alkyl aryl sodium sulfonate | 0.0025 |
| Gelatin | 0.5 |
| Water | 500 |
| Benzoyl peroxide | 5.0 |
| Hydrogen peroxide (100% $H_2O_2$ basis) | 10.0 |

The components in this polymerization recipe were added as in Example I. However, 5.0 parts of benzoyl peroxide and 10.0 parts of hydrogen peroxide per 100 parts of monomers were used. A conversion of 63 weight percent based on total monomers charged was obtained in a reaction time of about 15 hours at 70° C. The reaction mixture was a suspension of solid polymer. At the end of this time the water layer was decanted and the polymer was dissolved in benzene. This polymer solution was then poured into a vessel containing isopropyl alcohol and the polymer precipitated as small white solid particles. An elemental analysis of the polymer was made and the results are shown in the following table:

| | Weight percent |
|---|---|
| Carbon | 90.4 |
| Hydrogen | 8.0 |
| Sulfur | 0.4 |

This indicates that the monomers combined in the ratio charged to the polymerization zone.

*Example III*

Polymerization Runs A and B were carried out using the following recipes. The results show that, when a single catalytic material is employed, liquid polymers are produced.

| Ingredient | Parts by Weight | |
|---|---|---|
| | Run A | Run B |
| Styrene | 97.5 | 97.5 |
| tert-dodecyl vinyl sulfide | 2.5 | 2.5 |
| Alkyl aryl sodium sulfonate | 0.0025 | 0.0025 |
| Gelatin | 0.5 | 0.5 |
| Water | 500 | 500 |
| Benzoyl Peroxide | 1.0 | none |
| Hydrogen Peroxide (100% $H_2O_2$ basis) | none | 1.5 |

In Run A of this example the suspension stabilizers, gelatin and the alkyl aryl sodium sulfonate, were dissolved in the water which had been added to the flask. After dissolving 1.0 part of benzoyl peroxide per 100 parts of monomers in a mixture of the proper proportions of the monomers, the solution was added to the reactor. The stirrer was operated at about 140 R. P. M. and the suspension in the reactor was heated to 70° C. After approximately 30 hours reaction time, the heat was removed, stirrer shut off, and the water phase in the reactor was decanted. The polymer was dried overnight at 50° C. and about 20 mm. mercury pressure. No solid polymer was formed. The polymer was thick, white, and more viscous than syrup.

In Run B of this example the water, suspension stabilizers, and monomers were added to a 5-liter flask and heat applied. While the suspension was warming to 70° C., the hydrogen peroxide was added. After stirring the reaction mixture for about 15 hours at 70° C., heating and agitating were discontinued. As the mixture cooled to room temperature, it separated into a polymer phase and an aqueous phase. The aqueous phase was removed by decantation. The polymer was found to be a relatively low molecular weight liquid which was almost completely soluble in methyl alcohol.

*Example IV*

Three additional runs were made as in Example I, except that the only catalysts used were those in the tabulation. The reaction time for each run was about 17 hours, with stirring, and the reaction temperature was 70° C. No solid polymer was formed in any of these runs.

| | Parts per 100 Parts Monomers | | |
|---|---|---|---|
| | Run 1 | Run 2 | Run 3 |
| Potassium persulfate | 0.3 | 3.0 | |
| Benzoyl peroxide | 1.0 | 1.0 | 1.0 |
| Ceric ammonium nitrate | | | 3.0 |

Examples I and II show that solid copolymers are formed employing two catalysts according to the invention, in a suspension type polymerization system. Example III shows that, when using an aqueous phase as the suspending medium, neither a monomer-soluble catalyst nor a water-soluble catalyst, alone, was effective to produce solid polymers. Further, when using a combination of monomer-soluble catalyst and water-soluble catalysts, runs 1, 2 and 3 of Example IV show that neither potassium persulfate nor ceric ammonium nitrate was an effective substitute for a peroxidic catalyst as the water-soluble catalyst to produce a solid polymer.

As will be evident to those skilled in the art, various modifications of this invention can be made or followed in the light of the foregoing disclosure and discussion without departing from the spirit or scope of the disclosure or from the scope of the claims.

We claim:

1. A process which comprises the suspension copolymerization, as distinguished from emulsion polymerization, of a thiovinyl ether with another monomer having at least one $CH_2=C<$ radical while said monomers are suspended as discrete droplets dispersed in a continuous aqueous suspending phase, said thiovinyl ether having the formula $$CH_2=CH-S-R$$

wherein R is a hydrocarbon radical containing from one to 18 carbon atoms, said polymerization being effected in the presence of a peroxide polymerization catalyst soluble in the monomers and selected from the group consisting of benzoyl peroxide, di(tertiary butyl)peroxide, methyltetrahydrofurane peroxides, aldehyde and ketone peroxides, acetyl peroxide, stearyl peroxide, toluyl peroxide, anisyl peroxide, tertiary butyl hydroperoxide, cumene hydroperoxide, methylcyclohexyl hydroperoxide, and cyclohexyl hydroperoxide and also in the presence of second peroxide polymerization catalyst soluble in said continuous aqueous suspending phase and selected from the group consisting of hydrogen peroxide, sodium peroxide, barium peroxide, peracetic acid, perbenzoic acid, perpropionic acid, 1-hydroxy-cyclohexyl hydroperoxide, and recovering solid copolymer.

2. A process of claim 1 wherein R is selected from the group consisting of a hydrocarbon radical selected from the group consisting of an alkyl, aryl, cycloalkyl, aralkyl, alkaryl and alkylcycloalkyl radical containing from one to 18 carbon atoms, and recovering a solid copolymer.

3. The process of claim 1 wherein the said polymerization is effected at a temperature in the range of 10 to 180° C.

4. The process of claim 1 wherein the said polymerization is effected at a temperature in the range of 40 to 90° C.

5. The process of claim 1 wherein the ratio of thiovinyl ether to the total monomers is in the range of from 0.5–30 parts per 100 parts of monomers.

6. The process of claim 1 wherein the said monomer-soluble catalyst is present in the range from 0.3 to 15 parts by weight per 100 parts of monomers, and the said water-soluble catalyst is present in the range from 0.1 to 30 parts by weight per 100 parts of monomers.

7. The process of claim 1 wherein the said monomer-soluble catalyst is present in the range from 1 to 5 parts by weight per 100 parts of monomers, and said water-soluble catalyst is present in the range from 0.5 to 10 parts by weight per 100 parts of monomers.

8. The process of claim 1 wherein the said thiovinyl ether is at least one of the group consisting of methyl vinyl sulfide, ethyl vinyl sulfide, tert-butyl vinyl sulfide, 3-methylpentyl vinyl sulfide, tert-dodecyl vinyl sulfide, octadecyl vinyl sulfide, cyclohexyl vinyl sulfide, phenyl vinyl sulfide, xylyl vinyl sulfide, tolyl vinl sulfide, benzyl vinyl sulfide, 1-naphthyl vinyl sulfide, methylcyclohexyl vinyl sulfide, and alpha-methylcyclohexyl vinyl sulfide.

9. The process of claim 8 wherein the said monomer having at least one $CH_2=C<$ radical is at least one of the group consisting of 1,3-butadiene, isoprene, chloroprene, 2,3-dimethyl-1,3-butadiene, methylpentadiene, piperylene, styrene, alpha - methylstyrene, p - methoxystyrene, 2-vinylpyridine, 2-methyl-5-vinylpyridine, 3-ethyl-5-vinylpyridine, and 2-vinyl-5-ethylpyridine.

10. The process of claim 1 wherein said copolymerization is effected in the presence of an amount of a suspending agent which will facilitate suspension polymerization and the formation of discrete polymer particles.

11. The process of claim 10 wherein said stabilizing agent is at least one of the group consisting of methyl cellulose, sodium alginate, gum tragacanth, karaya gum, gelatin, an alkyl aryl sodium sulfonate, finely divided magnesium phosphate, a fatty acid soap, and a rosin acid soap.

12. A process which comprises the suspension copolymerization, as distinguished from emulsion polymerization, of tertiary-dodecyl vinyl sulfide with styrenes while the same are suspended as discrete droplets dispersed in a continuous aqueous suspending phase, said polymerization being effected in the presence of both benzoyl peroxide and hydrogen peroxide as catalysts.

13. A process of claim 12 wherein the ratio of said tertiary dodecyl vinyl sulfide to said styrene plus said tertiary dodecyl vinyl sulfide is in the range from 0.5–30 parts per 100 parts.

14. A process of claim 12 wherein said benzyl peroxide is present in the range from 0.3 to 15 parts by weight per 100 parts of the monomers and the said hydrogen peroxide is present in the range from 0.1 to 30 parts by weight per 100 parts of the monomers.

References Cited in the file of this patent

UNITED STATES PATENTS

| | | |
|---|---|---|
| 2,125,649 | Reppe | Aug. 2, 1938 |
| 2,534,120 | Glick | Dec. 12, 1950 |
| 2,300,566 | Hahn | Aug. 28, 1951 |
| 2,565,783 | Schouteden | Aug. 28, 1951 |
| 2,652,392 | Hohenstein | Sept. 15, 1953 |
| 2,691,646 | Young | Oct. 12, 1954 |

FOREIGN PATENTS

| | | |
|---|---|---|
| 662,156 | Germany | July 7, 1938 |

OTHER REFERENCES

Schildknecht: "Polymer Processes," Interscience (received May 1956), pages 84 and 85.